United States Patent [19]

Bose

[11] 4,399,107

[45] Aug. 16, 1983

[54] ANTI-POLLUTION AND ENERGY CONSERVATION SYSTEM

[76] Inventor: Ranendra K. Bose, 6728 Carmen St., Metairie, La. 70003

[21] Appl. No.: 154,479

[22] Filed: May 29, 1980

Related U.S. Application Data

[63] Continuation-in-part of Ser. No. 000,173, Jan. 2, 1979, Pat. No. 4,235,845.

[51] Int. Cl.$^3$ .............................................. B01D 53/34
[52] U.S. Cl. ....................................... 422/170; 55/256; 60/282; 60/310; 261/22; 422/189
[58] Field of Search .............. 422/169, 170, 189, 193; 60/282, 297, 279, 310, 311, 278; 261/22; 55/256

[56] References Cited

U.S. PATENT DOCUMENTS

| | | | |
|---|---|---|---|
| 3,423,324 | 1/1969 | Best et al. | 422/189 X |
| 3,737,515 | 6/1973 | Veloso | 60/297 X |
| 3,757,521 | 9/1973 | Tourtellotte et al. | 60/297 X |
| 3,853,484 | 12/1974 | Sudar et al. | 422/171 X |
| 3,861,142 | 1/1975 | Bose | 55/17 X |
| 4,147,756 | 4/1979 | Dahlstrom et al. | 422/169 X |

*Primary Examiner*—Richard L. Chiesa
*Attorney, Agent, or Firm*—Zalkind & Shuster

[57] ABSTRACT

The invention provides a pair of exhaust gas separation stages comprised in a gas separating vortex tube having an exhaust gas operated turbine impeller or rotor with stator wheels. The system combination also includes a mixing chamber for heavier and lighter combustible gas components subsequent to separation, wherein such components are directed to the top surface of a water charge in the mixing chamber, and further includes a pair of chemical separation chamber downstream of the mixing chamber containing specified chemicals wherein the mixing chamber removes substantial parts of formaldehyde and nitrous oxides while the chemical chambers remove acetaldehyde and higher aldehyde components. Finally, the gas mixture from the chemical separation chamber passes through a water scrubber to remove traces of chemicals which may be used to keep traces of chemicals in the chemical chamber from reaching the engine. In particular, the use of a pair of chemical chambers in serial flow arrangement increases the actual life of the chemical solutions and also the efficiency of the aldehyde removal process.

3 Claims, 3 Drawing Figures

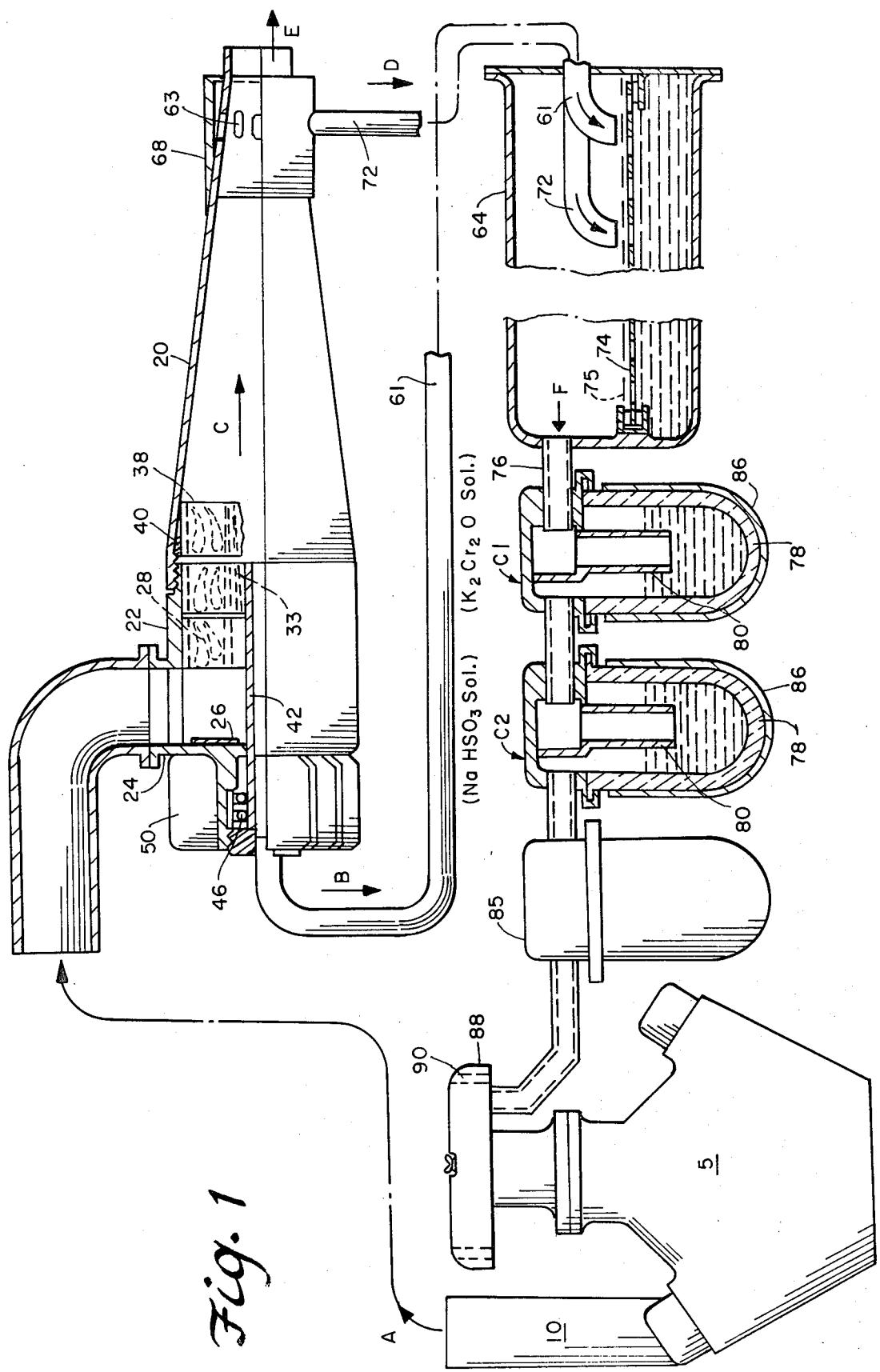

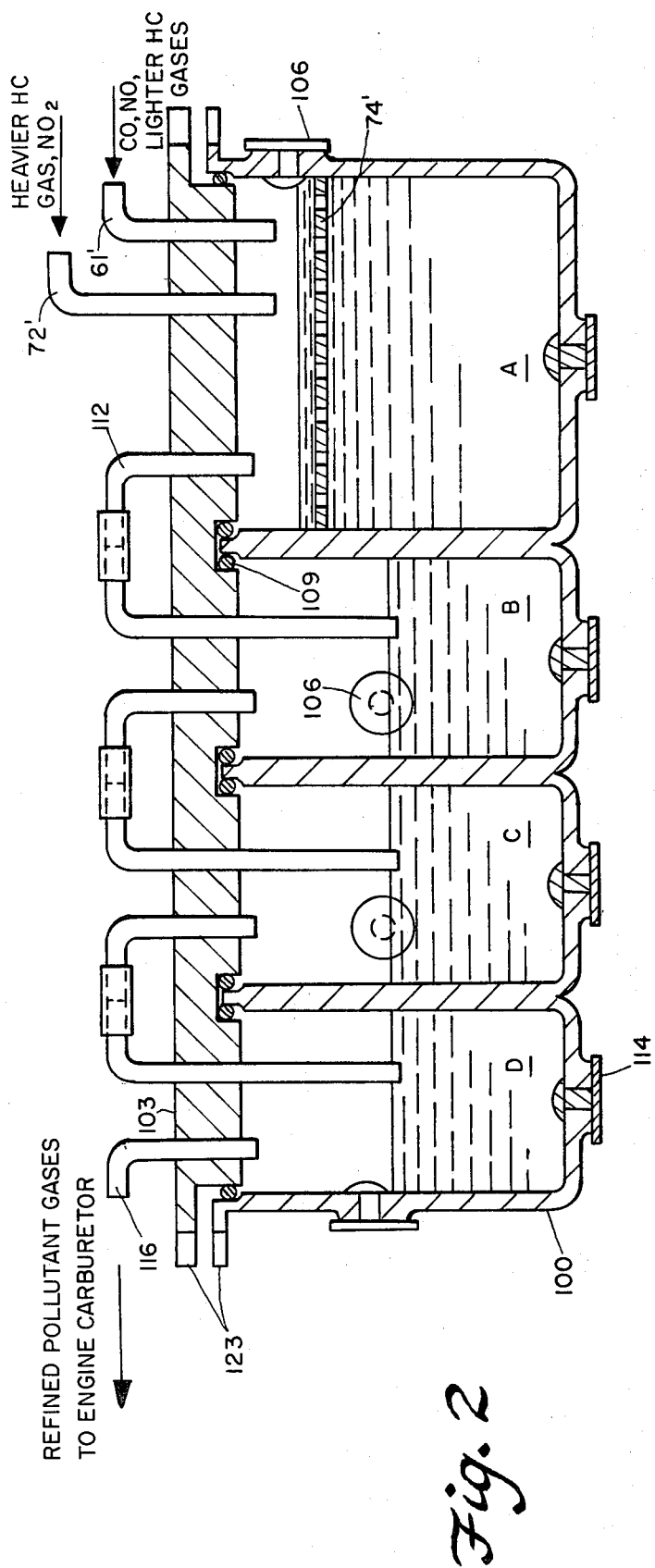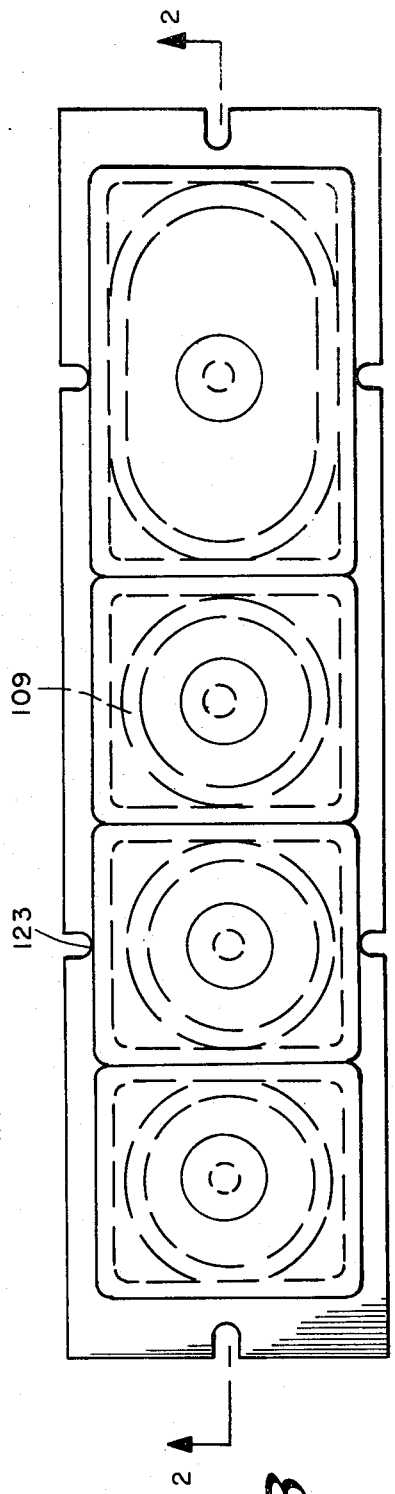

ANTI-POLLUTION AND ENERGY CONSERVATION SYSTEM

This application is a continuation in part of my application for Anti-Air Pollution System for Exhaust Gas, filed Jan. 2, 1979, Ser. No. 000,173 now U.S. Pat. No. 4,235,845 issued Nov. 25, 1980.

The invention is an improvement over the system shown in my copending patent application Ser. No. 000,173 filed Jan. 2, 1979, now U.S. Pat. No. 4,235,845, Nov. 25, 1980 and over systems shown in my prior U.S. Pat. Nos. 3,861,142, issued Jan. 21, 1975, and 3,892,070, issued July 1, 1975, and Canadian Pat. No. 1,030,777. Both U.S. patents are incorporated by reference herein, the present disclosures being based primarily on the copending application which is repeated herein wherein the present application also teaches the use of separate chemical chambers in tandem for reasons to be described.

In brief description of the aforementioned U.S. Pat. Nos. 3,861,142 and 3,892,070, which were copending, the earlier filed U.S. Pat. No. 3,892,070 shows and claims the basic combination of turbine impeller and conical vortex tube. Thus, an engine exhaust effects rotation of a turbine impeller which increases the speed of exhaust gas passing therethrough into the conical vortex tube wherein the whirling gas mass is centrifugally stratified into a core of lighter unburned combustible gases fed back from the larger end of the vortex tube to the engine while an outer layer of heavier gas exhausts at the smaller end to atmosphere. U.S. Pat. No. 3,861,142 improves the combination in salvaging from the component of heavier gas outer layer certain heavier combustible portions that are mixed with the separated lighter gas component and fed back to the engine, passing through a mixing chamber containing a water charge that removes pollutants such as aledhydes and nitrous oxides. A final portion comprising lighter non-combustible components of the heavier gas layer passes to exhaust at the smaller end of the vortex tube.

U.S. Pat. No. 3,861,142 effects gas separation in two stages instead of the single stage shown in U.S. Pat. No. 3,892,070. Both teachings use a turbine impeller having dimensions based on a six-cylinder engine (Ford Fairlane, 1965, 200 c.i.d) as noted in U.S. Pat. No. 3,861,142, and it will be appreciated that dimensional changes can be readily engineered for other engines dependent on number of cylinders and cubic displacement.

The copending application improved the arrangement of the vortex separation system shown in my prior patents and added a chemical separation chamber for separation of aldehydes.

The copending application effects improvements over the teachings of my prior patents, based upon long experimentation and testing. Thus it was found that an increase in the number of blades on the turbine impeller to a multiple of twice the number of cylinders e.g., for an eight cylinder car sixteen blades on the impeller increased the velocity energy of the exhaust gases in the vortex tube by an increase in the energy conversion efficiency of the turbine. A stator wheel upstream of the turbine impeller with gas entry to the stator wheel reduces turbulence, and more importantly, a stator wheel downstream of the turbine impeller overcomes an unexpected effect in operation of the invention, in that on test at about 1300 rpm in at least two different automobile, i.e., six and eight cylinder engines, the turbine impeller was found to slow down. It was discovered that this was due to the exit gas from the impeller, when going into the vortex tube, was actually spinning in a reverse direction from the rotational direction of the impeller. The result was a slowing down of the separated lighter gas component in emerging at the larger end of the vortex tube. The advantages of this simple expedient of a downstream stator wheel which are unique to operation of the overall system will be subsequently described as to further benefits discovered.

As used in prototype experiments and testing, the impeller and stator wheels are of the shrouded type.

Further, in my prior U.S. Pat. No. 3,861,142, a mixing chamber conducted gases to be mixed upwardly through a water charge. This was found to cause back pressure and under very cold conditions the water could freeze and stop system operation. In the copending and present invention, the gases to be mixed are conducted to the surface of the water charge to overcome the stoppage of the system operation due to freezing of the water charge.

Gas analysis laboratory tests showed that certain higher aldehydes and acetaldehyde was present in the recycled gas mixture. A chemical separation chamber overcomes the problem and a water scrubber is used to remove chemical traces. The present invention improves the chemical chamber separation effect of the arrangement shown in the copending application Ser. No. 000,173.

The invention herein is shown in the accompanying drawing wherein:

FIG. 1 illustrates the overall combination;

FIG. 2 is an elevation in section showing a construction wherein all wet chambers are combined in a single integral body for positioning under the hood of a car; and, FIG. 3 is a plan view of the combined chamber construction.

Referring to FIG. 1 of the drawing, the alphabetical reference characters A–F designate the same gases or gas mixtures using the same reference characters as found in my prior U.S. Pat. No. 3,861,142 as follows:

| Arrow | Gases |
|---|---|
| A | Exhaust from engine manifold, gas mixture of combustible and non-combustible gases, feed to rotate turbine impeller |
| B | Lighter inner core of gas mixture comprising primarily combustible gas such as carbon monoxide, nitric oxide, ethylene, methylene, ethane, methane. |
| C | Heavier of the heavy outer layer of gas mixture of combustible and non-combustible gases such as propane, butane, nitrogen dioxide and the lighter of the heavier gases such as carbon dioxide, water vapor with some traces of nitrogen oxide, butane, propane. |
| D | Substantially a mixture of the heavier of the heavy gases, as above. |
| E | Substantially a mixture of the lighter of the heavier gases, as above. |
| F | Mixture of combustible light and heavy pollutants passing to carburetor air filter housing (through chemical separation stages and water scrubber to be described). |

In the FIG. 1 of the drawing, the exhaust manifold of engine 5 connects via pipe 10 to the inlet at the larger end of the votex tube 20, this being a cylindrical housing 22 which the conical vortex tube connects, and having entry port 24 connecting to pipe 10. Within such housing is a heat shield 26 and stator wheel 28 secured upstream of turbine impeller wheel 33 downstream of which is a further stator wheel 38 at the large end of the vortex tube secured on by welding as at 40.

It will be appreciated that suitable support for the impeller is provided on a hollow axial rotary shaft 42 extending up to the large end of the vortex tube and exteriorly of the cylindrical housing carried on a bearing 46 within the cylindrical housing the outer end of which is fashioned into a hub from which radially extend air cooling fins such as 50.

The cylindrical housing may, as shown, be a single integral casting along with the cooling fins with gas exhaust inlet port opening 24. The stator wheel 38 can be fixed in any obvious manner as by welding, force fitting, splining, etc.

It will be apparent from the above description that exhaust gases from pipe 10 in the direction of arrow A enter stator wheel 28 where they are deflected to smoothly pass through to the impeller 33 effecting rotation of the impeller carried on the bearing 46 via shaft 42. In this instance, the gases enter into the impeller and emerge from stator 38 spinning in a direction to centrifugally stratify in the vortex tube 20.

Thus, the core of lighter gas mixture passes reversely through the hollow shaft 42, in the direction of arrow B, through pipe 61 to the mixing chamber 64. This effects the first separation stage. However, the mixture of heavier gases moves in the direction of the arrow C and, still rotating upon reaching the outer smaller end of the vortex tube 20, the heavier combustible gases emerge through the ports 63 into the second stage chamber 68 and then via pipe 72 in the direction of the arrow D to the mixing chamber 64. The lighter of the heavier gases which are non-combustible exhaust at the end of the vortex tube, arrow E.

Referring back to the stator 28, the placement of such a stator before a turbine impeller is of conventional practice. However, the placement of the stator 38 downstream of the impeller 33, while of apparent conventional practice, is by no means for the conventional effect found in gas turbines. Experimentation and testing brought to light the puzzling effect that the lighter gases through the pipe 61 were being slowed up for some reason or other at an engine speed of about 1300 rpm in at least two different test automobiles. It was ultimately discovered that the rotating gas mass leaving the turbine impeller blades was spinning in a direction opposite to the rotational direction of the impeller. It was further found that such opposite directional rotation was slowing down the lighter combustible gas mixture passing through pipe 61. Accordingly, in order to prevent such opposite rotation of a gas mixture leaving the turbine impeller, the stator 38 was added in order to redirect such gas mixture into the same rotational direction as the impeller. The result produced was that the passage of gas mixture in the core of the whirling gas in the vortex tube faces lesser flow resistance in passing through the sleeve 42 and the slowdown of flow in pipe 61 alleviated.

A further beneficial effect is found in the addition of the stator 38 in that it improves the separation quantity of the lighter gas mixture passing from the vortex tube through shaft 42 and likewise increased the quantity of heavier gas mixture passing toward the second separation 68. This is attributed to increased conversion of exhaust gas pressure energy into higher velocity energy effected by the presence of the stator 38. Thus, an overall improved separation effect was noted.

While still on the subject of the turbine, and whereas in my prior patent it was stated that the impeller should have a number of blades equal to the number of cylinders in the engine or a multiple thereof, it has now been ascertained that, by using a multiple of two, the impeller speed for a particular exhaust gas velocity is considerably increased. Thus, in actual experimentation with an eight-cylinder engine, it has been found that providing sixteen blades on the impeller considerably enhanced the rotational speed of the gases passing therethrough and by virtue of the stator 38 preventing opposite rotation of such gases, the greater rotational speed produced a stronger centrifugal separating effect between heavier and lighter gas components. However, it is not believed essential to double the number of blades on the stator wheels. The improved result taught herein was obtained with a downstream stator wheel of eight blades and a sixteen blade impeller as noted above, using a sixteen blade upstream stator wheel.

As hereinabove stated in connection with the mixing chamber 64, the lighter and heavier gases which are still combustible emerge from pipes 61 and 72 over a water bath for removal of formaldehyde and nitrous compounds, such as $NO_X$. In this instance, a catalytic plate 74 of zinc is carried in the water bath within the chamber approximately ¼" below the water surface 75 and is provided over its areas with 3/16" apertures separated from each other by approximately ½" center to center. Such a catalytic plate was disclosed in my U.S. Pat. No. 3,861,142.

The particular structure of the chamber and the support means of the catalytic plate are of no patentable moment herein and any suitable construction is useable as well as emptying and filling fittings. However, it will be apparent that mixed gases in chamber 64 exposed to the water surface by being directed thereto cannot produce any back pressure as was found to be the case when bubbled upwardly therethrough, nor can freezing of the water block off flow of recycled gas mixture. Further, in the event of freezing of the water charge it will be apparent that the hot gases will very quickly cause melting and thus resumption of absorption by surface contact of formaldehydes and $NO_X$ soon resumed.

The gas mixture then passes from the mixing chamber 64 (arrow F) via pipe 76 into chemical solution chambers C1, and C2 for removal of aldehydes as will be described.

Thus, the particular improvement in the present application resides in the provision of the separate chemical chambers C1 and C2 as shown on FIG. 1, instead of a single chemical chamber.

Chemical chamber C1 contains potassium dichromate ($K_2Cr_2O_7$), an oxidizer, while chamber C2 contains sodium disulfite ($NaHSO_3$), an absorbent. Acting in tandem the chemical chambers remove aldehydes and higher aldehydes.

In experimental testing it was found that 250 gms of potassium dichromate in 1,000 cc of water and 125 gms of sodium disulfite in 1,000 cc of water gave practical results.

The reason for removal of such higher aldehydes is that they create a combustion inhibition problem in the engine and a consequent increase in hydrocarbon emissions. The problem increases due to efficiency of gas separation with the system of the prior invention utilizing the stator wheel 38, since there is effected a greater amount of unwanted aldehydes due to the increase in combustible gas mixture.

The actual construction of the chemical separation chambers is similar to that of a water filter assembly used in compressed air lines for bubbling the gas mixture from mixture chamber 64 into a chemical solution which half fills a glass globe except that the filter as used in a compressed air line has been replaced by the open ended aluminum tube 80.

A considerable improvement in longevity of the chemical activity was found to occur by the use of two chemical chambers in tandem, each with its own chemical solution as compared with a mixture of both chemicals in the same chamber.

Downstream of the chemical separation chambers is preferably placed a water scrubber chamber 85 which is essentially the same construction as the chemical separation chamber but containing only water and serves to remove any chemical of the chemical solution that may have been entrained in the gas mixture so that it will not reach the engine where such chemicals may be harmful.

The globes of the chemical separation chambers and the scrubbing chamber are preferably jacketed as at 86 with heat insulating jackets, as shown, to deter freezing and both chambers are contemplated to be located in the engine compartment. Future development indicates that all chambers could be a single assembly unit under the car hood as later described.

Finally, the gas mixture feeds back preferably to the bottom of the air filter housing 88 and inside the air filter ring 90 where the recycled gas mixture of lighter and heavier constituents are picked up through the throat of the carburetor in engine operation.

An alternate method of gas input to the engine air intake could be through a vacuum control valve operated by engine manifold vacuum and set to open for recycled gas flow to the engine of between 13" and 16" of vacuum. Various other arrangements can be made. However, it has been found that the arrangement of the chemical chambers and the water scrubber leading to the bottom of the air filter through a conventional ¾" pipe within the filter ring produces easy admission and a reduced back pressure.

As a comparison of the chemical separation of aldehydes in the arrangement of the previously filed application, Ser. No. 000,173, and the present application, it has been noted that the arrangement of the present application yields approximately a 400 percent improvement in separation effect by the use of tandem chemical chambers having serial flow. Preferably, the upstream chamber C1 contains the potassium dichromate solution while the downstream chamber C2 contains the sodium disulfite solution. Such sequence is significant for proper operation and maximum efficiency.

In the arrangement of the single chemical chamber of the previously filed application, formaldehydes and gases of nitrous and nitric oxide were dissolved in the water bath of the gas mixing chamber and then in the single chemical chamber the potassium dichromate oxidized the acetaldehyde (higher aldehydes) to form acetic acid which was then neutralized by absorption in the sodium hydroxide solution also present in this chamber. However, it was subsequently discovered that the acetadehydes were not being fully oxidized in the single chamber and an unoxidized portion was being led to the engine.

In the present invention, the use of the two chemical chambers C1 and C2 in tandem allows for the absorption of the unoxidized portion of the acetaldehydes coming from the potassium dichromate chamber C1, such absorption of higher aldehydes taking place in the downstream sodium disulfite solution chamber C2.

In actual experimentation and testing using a single chamber with a mixed solution of potassium dichromate (74 grams) and sodium hydroxide (15 grams), in accordance with the arrangement of the previously filed application, there resulted a total aldehyde and acetic acid separation of 326 milligrams with all of the chemicals used up in the chamber during its operation on a car for approximately 100 miles of test run. However, with the arrangement of the present invention using tandem chemical chambers wherein the upstream chamber C1 consuming 111 grams of potassium dichromate and the downstream chemical chamber C2 consuming 88 grams of sodium disulfite, there was a total of aldehyde and acetic acid separation of 3,516 milligrams in a test run of approximately 1600 miles. Thus, the single chamber separation effect was in an amount of 2.66 milligrams per gram of chemical used in the mixed solution. The separation effect in the present invention with tandem chambers is considerably higher at 17.67 milligrams per gram of chemical used. Accordingly, the improved effect in economy of chemical usage is approximately 400 percent, as mentioned.

The reason for the considerably increased longevity of the tandem arrangement is believed to reside in the fact that the sodium hydroxide was partially neutralizing the potassium dichromate. In effect, the use of tandem chambers removes the possibility of such harmful interaction of the chemical reagents, and the use of sodium disulfite has been found to be more effective for the removal of such aldehydes which are not converted into acetic acid in the potassium dichromate solution chamber by oxidation. Such aldehydes (higher aldehydes) which reach the second chamber are to a considerably improved extent absorbed therein by the sodium disulfite solution.

The chamber 85 of the present invention is the water scrubber downstream of the tandem chemical chambers which removes all overspray traces of the chemical reagents from the gases as they flow into the engine. The chemical overspray if allows into the engine could harmfully effect its life and functioning.

Thus, the use of the tandem chemical chambers as described removes at least acetaldehyde and possibly other higher aldehydes of which I am not aware, although my observation is that aldehydes higher than acetaldehydes could reach the engine. Nevertheless, there is marked improvement in effectiveness of the arrangement over that of the prior application.

In connection with the above subject matter, it is pointed out that the amounts of chemical use have been found to be substantially effective in half molar strength solutions, thus economizing on chemical quantities needed in the practice of the invention.

Attention is now called to FIG. 2 which shows a multi-chamber tank arrangement of four chambers all as an integrally plastic molded body 100 with a cover 103 which may be an integral piece as shown in FIG. 3, or separate pieces may be used. In any event the tank is divided into chambers A, B, C, D wherein A is a mixing chamber, the equivalent of chamber 64 including zinc plate 74'. Chamber B contains a solution of potassium dichromate, e.g., 250 gms in a 1,000 cc of water; chamber C contains a solution of sodium disulfite, e.g., 125 gms in a 1,000 cc of water and the chamber D is a scrubber chamber similar to the scrubber chamber 85 of FIG. 1 in function and contains a 1,000 cc water charge. Each chamber has a removable filler plug, such as 106 and a Neoprene O-ring such as 109 set into the upper edges and in the complementary grooves of the cover as shown in FIG. 3 for frictionally sealing the cover to the chamber tops as will be understood from the drawing. The tubes 61' and 72' correspond to the tubes 61 and 72, respectively, of FIG. 1 for bringing the gases from the end of the vortex tubes to the mixing chamber. All four chambers are serially connected for sequential exhaust gas flow by U-shaped tubes, such as 112, wherein the upstream end for each tube is shortened to be above the liquid in the upstream tank and the downstream end of the tube sufficiently long to maintain protrusion into the liquid of the next chamber, consideration being given to a slanted liquid surface if a car is on a hill. It has been found in practice that a ⅛" protrusion is sufficient for practical operation under usual driving conditions. A final outlet tube 116 is provided for connection to the engine air filter. Drain plugs 114 are provided. All plugs may be of Neoprene.

Obviously, certain gases from the vortex tube go sequentially through the four chambers and thence into the air filter, i.e., filter 88 as shown in FIG. 1. Separation of pollutants takes place during such flow as explained above.

The particular arrangement just described is for the purpose of providing a single integral multi-chamber tank for all wet solutions which can be placed under the hood of a car and serviced conveniently, preferably each time an oil change is made. Thus the solution quantities are measured to have a life corresponding to the length of time between oil changes, and it will be understood that different capacity tanks may be designed for different cars for holding different quantities of the wet solutions depending upon manufacturer's specifications for time between oil changes.

For purposes of securing the tank, bolt openings such as slots 123 may be provided in peripheral flanges of the tank and cover wherein bolts of sufficient length may be used to fasten the cover and tank to brackets or other support under a car hood.

Further, the entire tank may be jacketed with insulating material to guard against extremes of temperature due either to under hood heat or freezing weather conditions.

Additionally, any suitable material for the tank and cover may be used, e.g., plastic as mentioned, or cast aluminum. If desired, the tubes 112 may be of the same material and connected in sections outside the chambers with rubber hose couplings as shown.

It is contemplated that the overall tank would be about 25" long, 9" high, and 5" wide for the large engine automobiles and proportionately reduced for the smaller ones.

What is claimed is:

1. In a system of the kind described for separating aldehyde pollutants from exhaust flow wherein said system has means for separating combustible and non-combustible exhaust components in exhaust gas, the improvement which comprises:

a pair of chemical separation chambers connected in tandem for serial flow of the combustible exhaust gas component therethrough;

one such chemical chamber having an aldehyde oxidizer and the second such chemical chamber having a higher aldehyde absorbent, for removal of aldehydes from said exhaust flow;

means for passing exhaust flow serially through such chemical chambers for retention in respective chambers of aldehyde components of exhaust gas;

including in combination therewith a mixing chamber upstream of said tandem chemical chambers and a scrubber chamber downstream of said tandem chemical chambers;

a multi-chamber tank and all of said chambers being comprised therein and being connected serially for sequential flow of exhaust gas therethrough;

said tank having an open top for all said chambers;

cover means sealingly closing the open tops of said chambers;

including tubes carried by said cover means for conducting exhaust flow sequentially through said chambers;

said cover means comprising an integral cover extending across the tops of said chambers and respective means sealing said cover at the open top of each said chamber;

said tubes comprising U-shaped members extending downwardly through said cover from said mixing chamber and each chemical chamber to said scrubber chamber so as to connect all of said chambers for flow sequence wherein each said chamber contains a liquid solution and the downstream ends of said tubes in said chemical and scrubber chambers extend below the surface of the liquid in the downstream chamber and wherein the upstream end of each of said tubes is above the liquid in the respective upstream chamber.

2. In a system as set forth in claim 1, each of said chambers having a respective filler and drain opening, and flexible plug closures for said openings.

3. In a system as set forth in claim 1, the periphery of said cover and said tank having flanges provided with registering bolt openings for securing said tank and cover together and to a mounting support.

* * * * *